(12) United States Patent
Viaud et al.

(10) Patent No.: US 10,577,071 B2
(45) Date of Patent: Mar. 3, 2020

(54) HATCH FOR CLOSING AN OPENING PROVIDED THROUGH AN AIRCRAFT STRUCTURE, RELATED STRUCTURE AND METHOD

(71) Applicant: DASSAULT AVIATION, Paris (FR)

(72) Inventors: Sandrine Viaud, Gradignan (FR); Claude Fons, Merignac (FR)

(73) Assignee: DASSAULT AVIATION, Paris (FR)

( * ) Notice: Subject to any disclaimer, the term of this patent is extended or adjusted under 35 U.S.C. 154(b) by 527 days.

(21) Appl. No.: 15/402,728

(22) Filed: Jan. 10, 2017

(65) Prior Publication Data
US 2017/0203828 A1    Jul. 20, 2017

(30) Foreign Application Priority Data
Jan. 14, 2016  (FR) ..................................... 16 00069

(51) Int. Cl.
    *B64C 1/14*    (2006.01)
    *B64D 1/02*    (2006.01)
    *B64D 25/08*   (2006.01)
    *B64D 1/12*    (2006.01)
(52) U.S. Cl.
    CPC .............. *B64C 1/14* (2013.01); *B64C 1/1407* (2013.01); *B64D 1/02* (2013.01); *B64D 1/12* (2013.01); *B64D 25/08* (2013.01)
(58) Field of Classification Search
    CPC ........... B64C 1/14; B64C 1/1407; B64D 1/02; B64D 1/12; B64D 25/08
    See application file for complete search history.

(56) References Cited

U.S. PATENT DOCUMENTS

| 2,432,640 | A | * | 12/1947 | Wilkes | ..................... B64D 1/02 89/1.51 |
| 4,474,101 | A |   | 10/1984 | Boulard et al. | |
| 2011/0049299 | A1 | * | 3/2011 | Gowing | .................... B64C 1/14 244/129.5 |

FOREIGN PATENT DOCUMENTS

EP        0 061 398 A1    9/1982

* cited by examiner

*Primary Examiner* — Justin M Benedik
(74) *Attorney, Agent, or Firm* — Davidson, Davidson & Kappel, LLC

(57) ABSTRACT

A hatch for closing an opening provided through an aircraft structure, related structure and method are provided. The hatch includes an inner sealing partition, intended to be mounted sealably on an aircraft structure and a locking assembly releasable from the inner partition on the structure. The hatch includes a valve for balancing pressure between an inner surface of the inner partition intended to be placed in an inner volume of the aircraft and an outer surface of the inner partition, intended to communicate with the outside of the aircraft. The valve is movable by a user between a closed sealing position and an open pressure balancing position. The releasable locking assembly is immobilized in its locking configuration when the valve is its closed sealing position.

17 Claims, 8 Drawing Sheets

HATCH FOR CLOSING AN OPENING PROVIDED THROUGH AN AIRCRAFT STRUCTURE, RELATED STRUCTURE AND METHOD

This claims the benefit of French Patent Application FR 16 00069, filed Jan. 14, 2016 and hereby incorporated by reference herein.

The Detailed Description and drawings of the present application were also filed in a U.S. patent application Ser. No. 15/402,740, entitled SYSTEM FOR DROPPING A PACKAGE FROM AN AIRCRAFT, RELATED AIRCRAFT AND METHOD, filed on the same date as the present application.

The present invention relates to a hatch for closing an opening provided through an aircraft structure, comprising:
- an inner sealing partition, intended to be mounted sealably on an aircraft structure,
- a releasable locking assembly for locking the inner partition on the structure, able to be maneuvered between a locking configuration and a released configuration of the inner partition.

Such a hatch is in particular intended to be used in a dropping system mounted in the fuselage of an aircraft to allow the secure dropping of parcels from the aircraft, in particular when the aircraft is an ocean search and rescue airplane.

The package is for example a search and rescue (SAR) chain. It includes an enclosure containing ocean survival equipment, such as a self-inflating pneumatic vessel, a distress beacon, a VHF radio and essential elements for survival (water, food, medicine, first aid, etc.).

BACKGROUND

To drop such packages, it is known it to arrange a lower opening in the floor of the aircraft closed off by a hatch system, provided with a deployable deflector. The dropping hatch has large dimensions, for example approximately one meter by 60 cm. The hatch and the deflector are electrically and/or hydraulically enslaved and are opened and deployed upon approaching the work area.

The pilot or an observer gives the green light to make the drop to an observer/dropper who manually ejects the package through the hatch.

SUMMARY OF THE INVENTION

Opening the dropping hatch therefore requires a complex mechanism and an auxiliary power supply. This causes regular reconditioning and maintenance operations, and an increased risk of breakdown.

Furthermore, it is necessary to provide security systems preventing the hatch from being opened when the aircraft is below a safe altitude, and optionally making it possible to balance internal and external pressures, before opening the hatch. This further complicates the structure of the hatch, as well as the necessary maintenance.

One aim of the invention is to provide a hatch for closing an opening arranged in the fuselage of an aircraft, which can be opened simply during flight, and which does not require frequent reconditioning and upkeep, while guaranteeing safety during the flight before opening the hatch.

To that end, a hatch of the aforementioned type is provided, characterized in that the hatch includes a valve for balancing pressure between an inner surface of the inner partition intended to be placed in an inner volume of the aircraft and an outer surface of the inner partition, intended to communicate with the outside of the aircraft, the valve being movable by a user between a closed sealing position and an open pressure balancing position, the releasable locking assembly being immobilized in its locking configuration when the valve is its closed sealing position.

The hatch according to the invention may comprise one or more of the following features, considered alone or according to any technically possible combination:
- the valve is mechanically connected to the releasable locking assembly in the closed sealing position, the valve being released from the releasable locking assembly in the open pressure balancing position,
- the valve includes a moving rod protruding from the inner surface of the inner partition, the releasable locking assembly comprising a blocking arm arranged on the side of the outer surface of the inner partition, the blocking arm defining a housing for receiving the moving rod in the closed sealing position,
- the releasable locking assembly comprises an actuating lever, arranged on the side of the inner surface of the inner partition, the lever being movable relative to the inner partition to transition the releasable locking assembly to the released configuration of the inner partition,
- the actuating lever is connected to the blocking arm through the inner partition,
- the releasable locking assembly comprises at least one closing pin able to immobilize the inner partition on the structure, the closing pin being connected to the lever by a transmission mechanism,
- the releasable locking assembly includes a bistable member, connected to the lever to keep it stable in the open configuration and the closed configuration,
- the hatch comprises a member for elastically biasing the valve toward its closed position,
- the inner partition defines at least one pressure balancing through aperture, the valve sealably covering the through aperture in the closed position, the valve allowing gas to pass between the inner surface and the outer surface of the inner partition through the through aperture in the open position,
- the hatch comprises a lock immobilizing the valve in the closed position, able to be maneuvered on the inner surface of the inner partition,
- the valve includes a manual grasping lug protruding inward away from the inner surface of the inner partition,
- the valve is able to be moved by a manual pulling force exerted on the lug up to a maximum pressure difference value between the inner surface and the outer surface of the intermediate partition, the maximum value being less than 10,500 Pa, the lug advantageously being configured to allow the exertion of a maximum manual pulling force comprised between 10 kgf and 15 kgf,
- the hatch comprises an outer partition intended to close off the opening in the fuselage, and an intermediate framework connecting the inner partition to the outer partition.

A system for dropping a parcel from an aircraft is also provided, comprising:
- a panel intended to form part of a skin of the aircraft, the panel defining a through opening emerging outside the aircraft,
- a hatch as defined above, the system comprising a sleeve guiding the hatch through the panel, the guide sleeve emerging in the through opening, the hatch being able to be maneuvered in the guide sleeve between a configuration closing the opening and a configuration allowing the parcel to pass through the through opening.

The system according to the invention may comprise one or more of the following features, considered alone or according to any technically possible combination:
it includes
a removable hatch,
a sleeve guiding the hatch through the panel, the guide sleeve defining the through opening, the hatch being able to be maneuvered in the guide sleeve between a configuration closing the through opening and a configuration allowing the parcel to pass through the through opening,
the hatch includes a releasable locking assembly, able to be accessible from inside the aircraft when the hatch is in its closing configuration,
the releasable locking assembly protrudes at least partially outside the guide sleeve in the closing configuration,
the system comprises a dropping guide for the parcel, at least partially deployable outwardly around the through opening in the parcel passage configuration,
the hatch is able to be completely removed from the guide sleeve in the parcel passage configuration, the dropping guide being able to be inserted in the guide sleeve, in place of the hatch in the parcel passage configuration,
the guide sleeve comprises guide openings for the dropping guide and/or the hatch arranged in the through opening,
the system comprises positioning stops for the dropping guide relative to the guide sleeve in an outwardly deployed position,
the dropping guide includes a tubular enclosure having an indentation at a free end deployable outside the panel,
the panel includes an outer wall intended to be placed in contact with a mass of air in which the aircraft circulates, an inner wall, intended to define a pressurized volume of the aircraft, and an intermediate wall connecting the outer wall to the inner wall, the guide sleeve traversing the panel between the outer wall and the inner wall,
the guide sleeve protrudes inward from the inner wall.
An aircraft is also provided, comprising:
a structure defining an inner volume, the structure including an outer skin defining an access passage to the inner volume,
a system as defined above, the panel being mounted in the access passage.

A method for freeing an opening arranged through an aircraft structure is also provided, the opening being closed off by a hatch as described above, comprising the following steps:
the releasable locking assembly is immobilized in its locking configuration when the valve is in its closed sealing position,
a user moves the valve between a closed sealing position and an open pressure balancing position; then
the releasable locking assembly is maneuvered between the locking configuration and the released configuration.

The method according to the invention may comprise one or more of the following features, considered alone or according to any technically possible combination:
the valve being mechanically connected to the releasable locking assembly in the closed sealing position, the method comprises releasing the valve away from the releasable locking assembly when the valve goes to the open pressure balancing position,
the method comprises
providing a system as defined above, the removable hatch occupying its closed configuration;
maneuvering the removable hatch in the guide sleeve to transition it to the parcel passage configuration;
inserting a parcel in the guide sleeve;
releasing the parcel through the through opening;
after maneuvering the removable hatch, it comprises deploying a parcel dropping guide around the through opening at least partially outside the panel, the dropping of the parcel comprising the passage of the parcel through the dropping guide;
the maneuvering of the removable hatch includes completely removing the hatch outside the guide sleeve, the deployment of the dropping guide comprising inserting the dropping guide in the guide sleeve in place of the hatch.

BRIEF SUMMARY OF THE DRAWINGS

The invention will be better understood upon reading the following description, provided solely as an example and done in reference to the appended drawings, in which.

DETAILED DESCRIPTION

Figure 1:
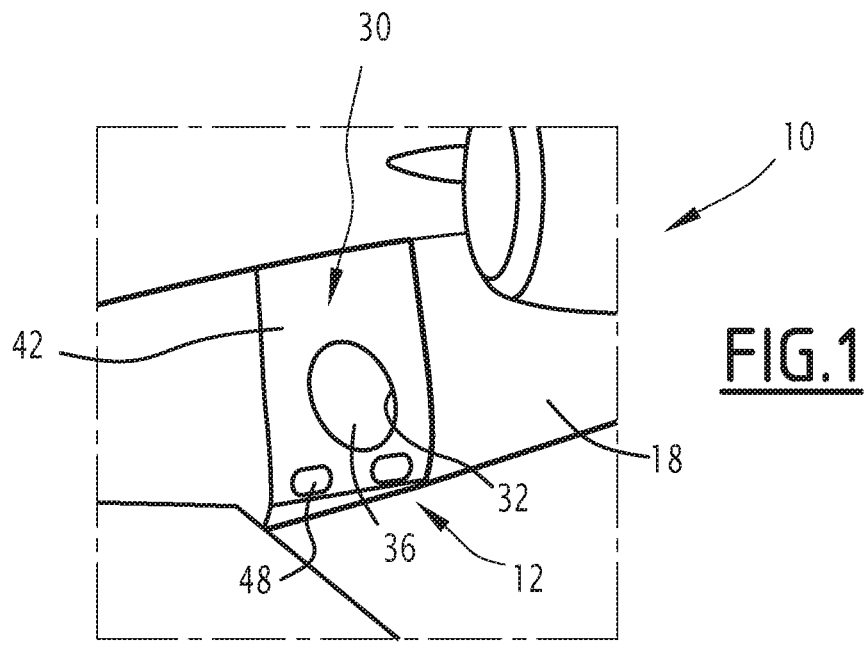
FIG. 1 is a perspective side view of an aircraft equipped with a dropping system according to an embodiment the invention in a closed configuration.

An aircraft 10 equipped with a first dropping system 12 according to an embodiment of the invention is schematically illustrated by FIG. 1. The dropping system 12 is intended to allow a package 13, visible in FIG. 2, to be dropped from the aircraft 10 when the latter is in flight.

The package is for example a search and rescue (SAR) chain. It includes an enclosure containing ocean survival equipment, such as a self-inflating pneumatic vessel, a distress beacon, a VHF radio and essential elements for survival (water, food, medicine, first aid, etc.). In this example, the enclosure of the package 13 has an elongated cylindrical shape.

Figure 15:
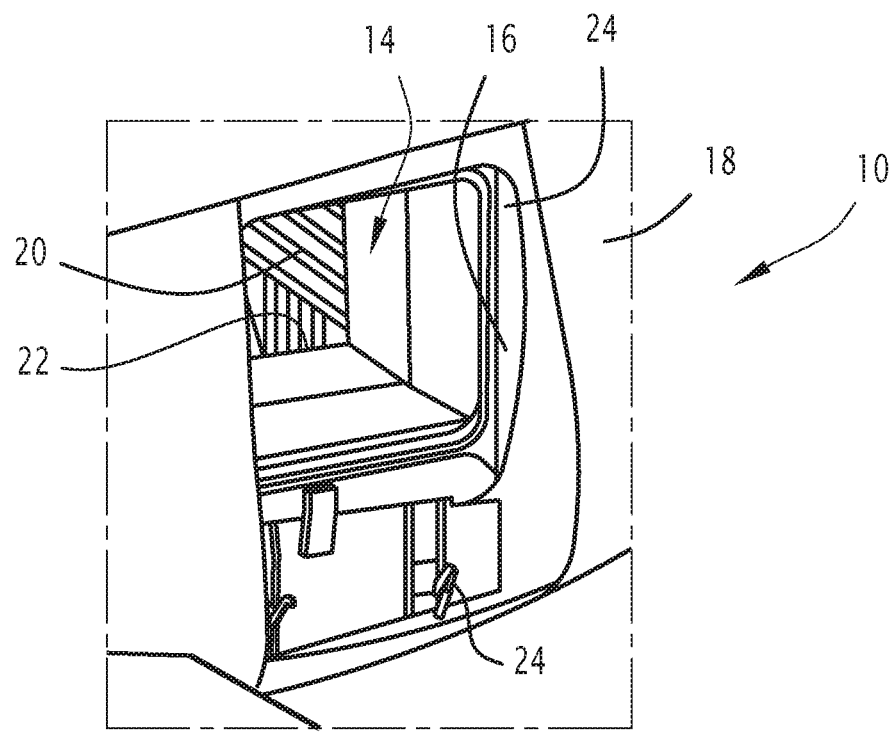
FIG. 15 is a view similar to FIG. 1, the dropping system having been disassembled.

In reference to FIG. 15, the aircraft 10 includes a structure 14 including an inner framework 16, and an outer skin 18, mounted on the framework 16.

The inner framework 16 defines an inner volume 20 of the aircraft 10 that emerges outwardly through the framework 16 and through the skin 18 by an access passage 22.

In this example, the access passage 22 is an access passage to a baggage compartment or a cabin of the aircraft, provided in the structure 14. This access passage 22 is able to be closed by a door defining part of the skin 18 of the aircraft 10.

The access passage 22 is provided with interfaces 24 for mounting a door.

The dropping system 12 is mounted in the access passage 22 in place of a door, via the same mounting interfaces 24 as those used to mount the door. The dropping system 12 is advantageously mounted removably in the access passage 22 in order to be replaced by a door if necessary.

When the dropping system 12 is mounted in the access passage 22, and is closed, as shown in FIG. 1, the inner volume 20 of the aircraft is able to be pressurized.

In reference to FIGS. 3 to 6, the dropping system 12 includes a panel 30 intended to be mounted in the access passage 22 in order to selectively close it off, the panel 30 having a through opening 32.

Figure 5:
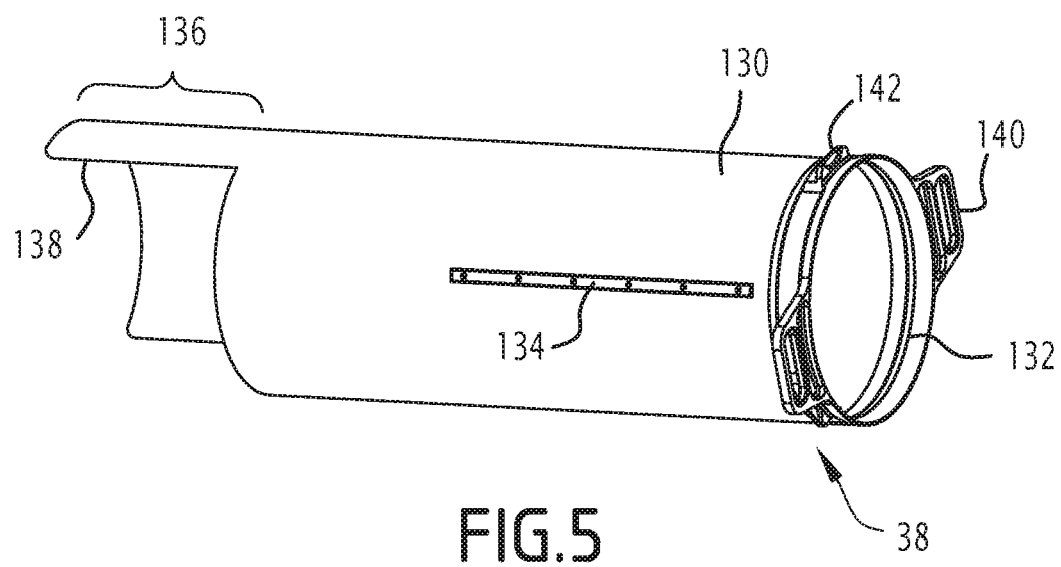
FIG. 5 is a perspective side view of a guide intended to be inserted in the panel of FIG. 3.
Figure 6:
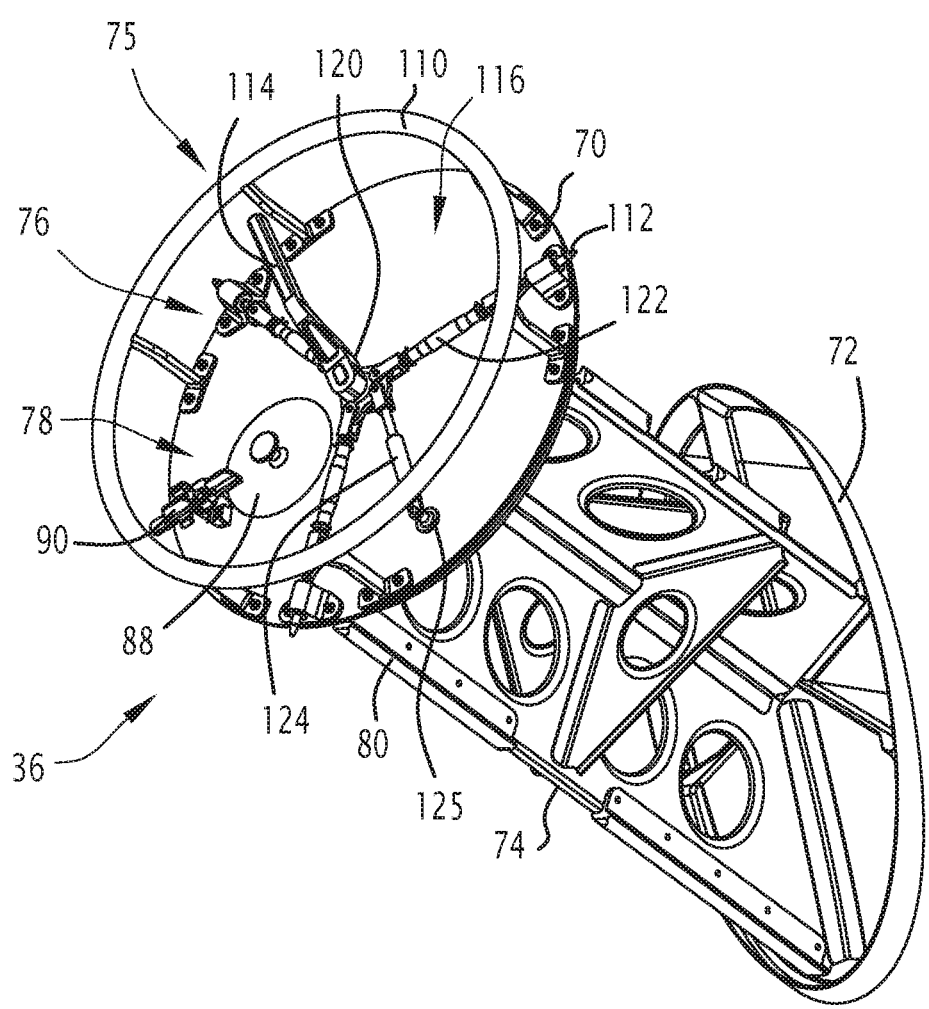
FIG. 6 is a perspective view of a hatch intended to be inserted in the panel of FIG. 3.

The dropping system 12 further includes a guide sleeve 34, defining the periphery of the through opening 32 of the panel 30, a removable hatch 36, visible in FIG. 6, intended to close the through opening 32, and a hollow dropping guide 38, visible in FIG. 5, intended to be deployed from the through opening 32 in place of the removable hatch 36.

Figure 3:
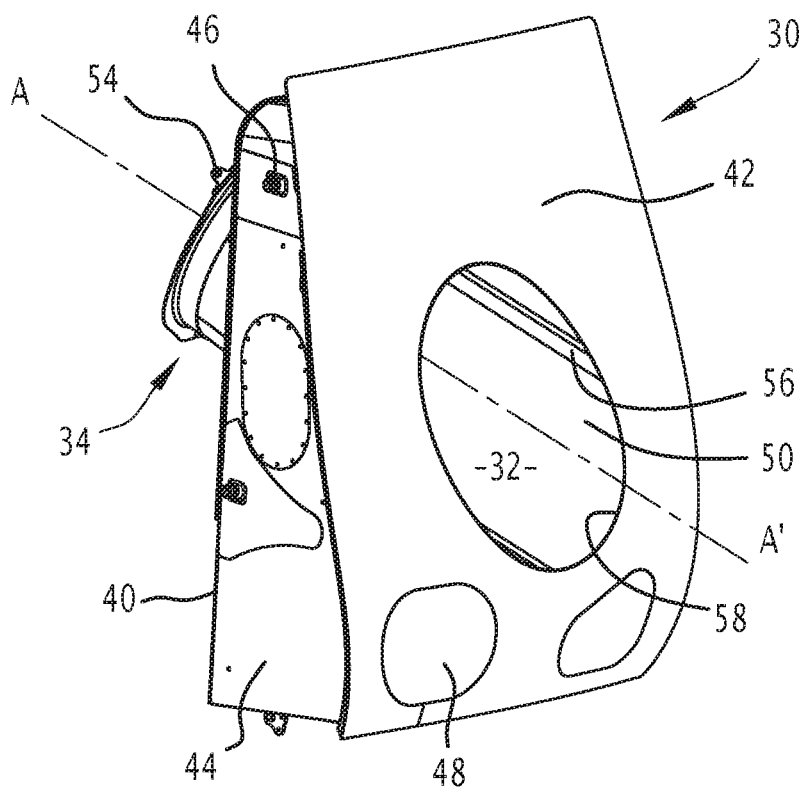
FIG. 3 is an outside view of the panel intended to form a skin of the aircraft in the system of FIG. 1.
Figure 4:
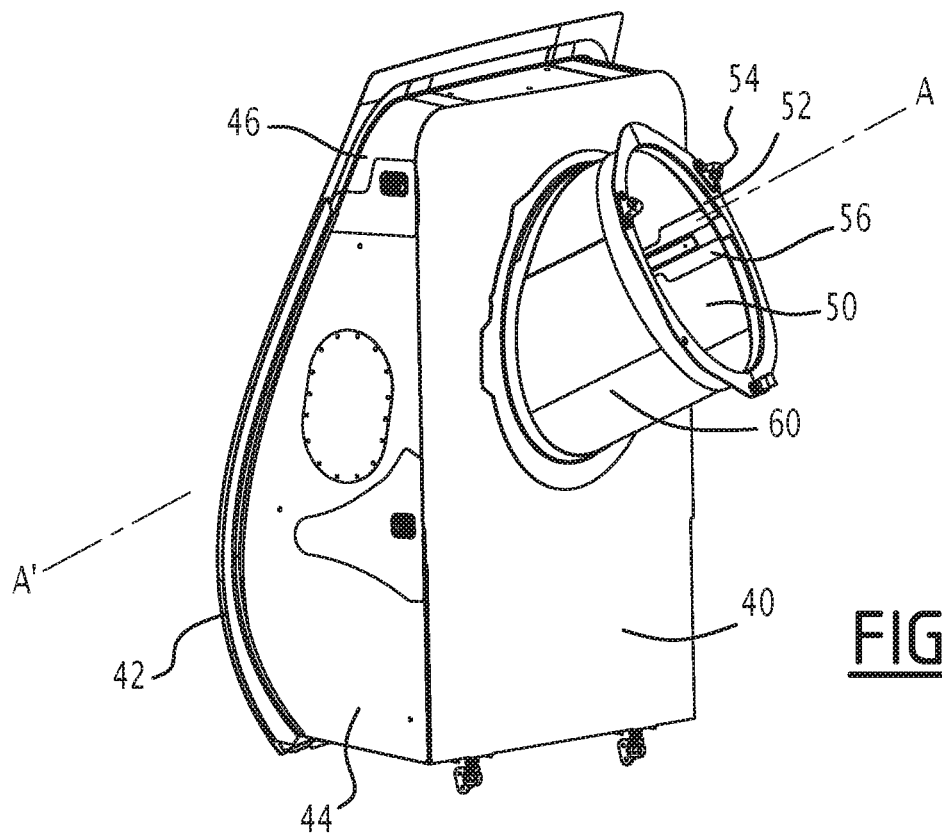
FIG. 4 is an inside view of the panel of FIG. 3.

In reference to FIGS. 3 and 4, the panel 30 includes an inner wall 40 intended to be placed in the inner volume 20, and an outer wall 42, intended to form part of the outer skin 18 of the aircraft and to be placed in contact with a mass of air in which the aircraft 10 travels.

The panel 30 further includes a peripheral intermediate wall 44 connecting the inner wall 40 to the outer wall 42. It is advantageously equipped with cold shuts 46 intended to cooperate with the interfaces 24 to fasten the panel 30 on the inner framework 16.

In this example, the inner wall 40 has a substantially vertical straight shape. The outer wall 42 has a curved shape to be flush with the adjacent fuselage panels on the outer skin 18.

The inner wall 40, the outer wall 42, and the peripheral wall 44 define an intermediate space (not visible) between them through which the guide sleeve 34 is inserted.

The outer wall 42 advantageously has access doors 48 to the intermediate space to allow the adjustment and locking of the panel 30 on the interfaces 24.

The guide sleeve 34 here extends inclined downwardly from the inside toward the outside through the inner space of the panel 30.

It includes a passage tube 50, and an inner collar 52, extending along the inner edge of the tube 50. It is provided with elements 54 for locking the hatch 36, elements 55 for locking the guide 38, and elements 56 for guiding the hatch 36 and/or the guide 38 in the through opening 32.

The tube 50 has an outer edge flush with the outer wall 42. It has an inner segment 60 protruding inward in the inner volume 20 from the inner wall 40.

The collar 52 protrudes radially from the inner free edge of the tube 50. It bears the locking elements 54.

The guide elements 56 are arranged in the tube 50, along the generatrices of the tube 50. In this example, they are formed by guide rails.

The through opening 32 extends through the tube 50 and emerges toward the outside through the outer wall 42. It emerges toward the inside at the collar 52.

In this example, the through opening 32 has a constant circular cross-section.

The hatch 36 is able to be maneuvered in the guide sleeve 34 between a configuration closing the through opening 32 and a configuration allowing the package 13 to pass through the through opening 34, in which it has been completely removed from the guide sleeve 34.

In reference to FIG. 6, the hatch 36 includes an inner partition 70 intended to close the guide sleeve 34, an outer partition 72, intended to be placed in the through opening 32 at the outer skin 18, to close the through opening 32, and an intermediate framework 74 connecting the inner partition 70 to the outer partition 72.

The hatch 36 further includes a handling assembly 75, a releasable lock, which in the form of a locking assembly 76, and a pressure balancing assembly 78 on either side of the inner partition 70.

The inner partition 70 has a contour corresponding to the outer contour of the guide sleeve 34. It is able to bear on an inner shoulder of the guide sleeve 34 defined at the collar 52, to be flush with the collar 52 in the closing configuration.

Figure 11:
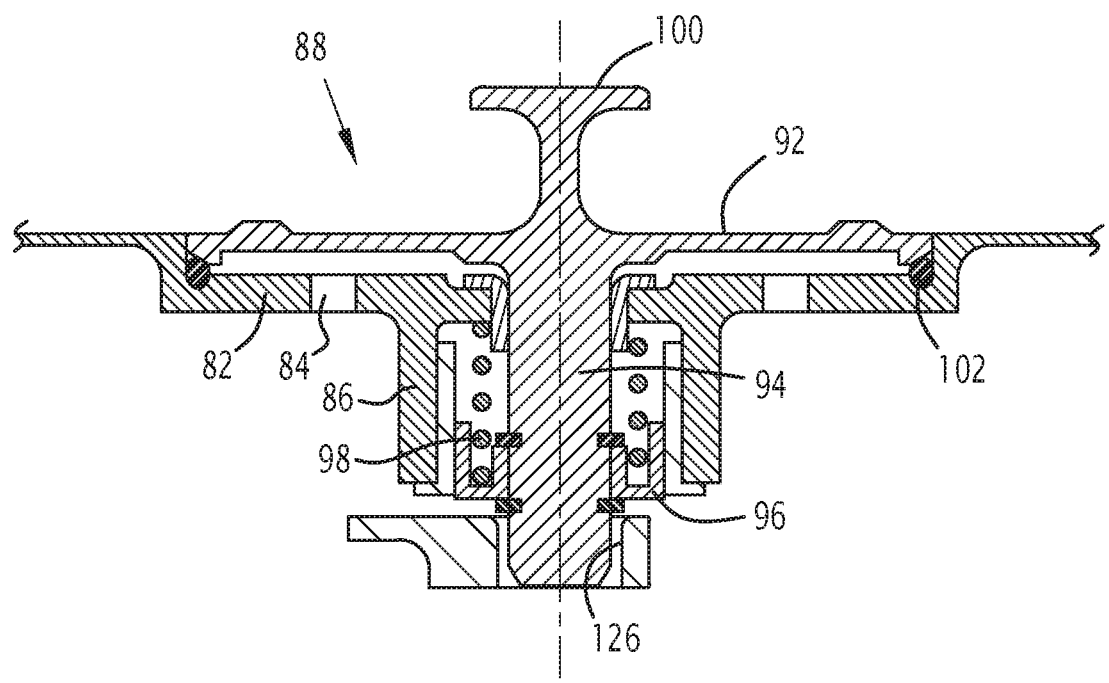
FIG. 11 is a sectional view of the valve in position on the inner partition, when it provides sealing.
Figure 12:
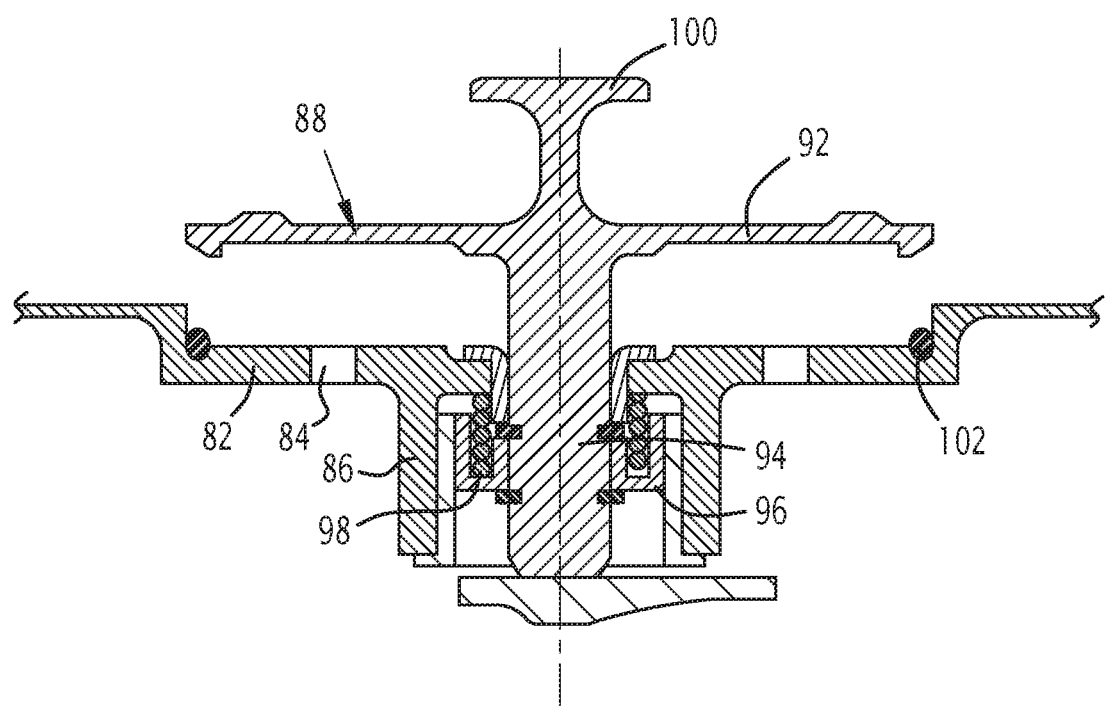
FIG. 12 is a view similar to FIG. 11, the valve having been moved to balance the pressures.

In reference to FIGS. 11 and 12, the inner partition defines a seat 82 for receiving the pressure balancing assembly 78. It defines at least one through aperture 84 for balancing pressures between an inner surface of the inner partition 70, intended to be placed across from the inner volume 20, and an outer surface of the inner partition 70, intended to be placed across from the through opening 32, while being oriented outward.

The seat 82 includes a cylindrical skirt 86 for guiding the pressure balancing assembly 78 protruding outward.

The outer partition 72 is flush with the outer wall 42 of the panel 30 in the closing configuration. It thus forms part of the outer skin 18 of the aircraft, in contact with a mass of air in which the aircraft 10 travels.

The intermediate framework 74 rigidly connects the inner partition 70 to the outer partition 72. It is provided with longitudinal guides 80 able to cooperate with the guide elements 56 arranged in the guide sleeve 34, to provide a translational movement of the hatch 36 in the guide sleeve 34 along an axis A-A' of the through opening 32, visible in FIGS. 3 and 4.

Figure 10:
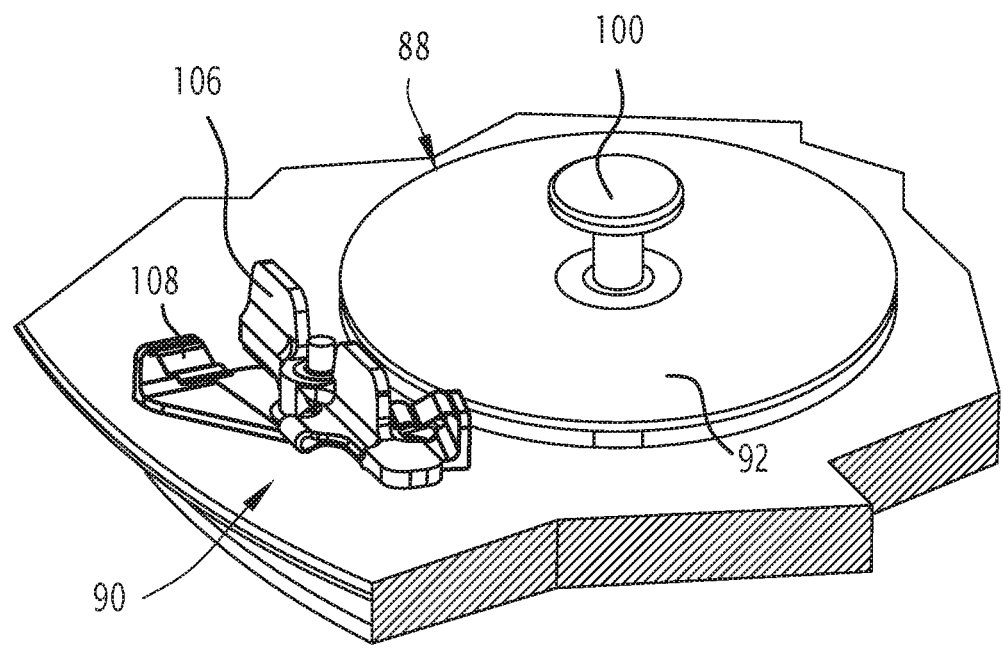
FIG. 10 is a view of the valve of the hatch of FIG. 6, the lock of the valve being in the open position.

In reference to FIGS. 10 to 12, the pressure balancing assembly 78 includes a balancing valve 88, able to be maneuvered manually, between a closed pressurization position and an open pressure balancing position, and advantageously, a valve lock 90 for keeping the valve 88 in the closed position.

The valve 88 includes a closing plate 92 intended to be inserted in the seat 82 to cover each aperture 84, a locking rod 94, inserted in the skirt 86, and provided at its free end with a maintaining ring 96, and a member 98 for elastically biasing the valve 88 toward its closed position.

The valve 88 further includes a gripping lug 100 protruding inward relative to the plate 92.

The plate 92 is able to sealably close the seat 82 and its apertures 84, advantageously with the insertion of the peripheral seal 102 in the closed position. It is able to be freed from the seat 82 to free an air circulation passage between the plate 92 and the seat 82 up to the apertures 84 in the open position.

The shape and size of the lug 100 limit the maximum manual pulling force on the valve 88 that can be exerted by a user along the longitudinal axis of the lug 100.

This force F, expressed in force-kilograms by the formula F=m·g, with g=9.81 m·s$^{-2}$, is comprised between 10 kgf and 15 kgf. Indeed, from 10 kgf, the handling of the valve 88 is made difficult and goes from difficult to impossible from 10 kgf to 15 kgf.

In particular, the geometry of the lug 100 prevents it from being grasped by more than two fingers and thus limits the force manually developed by the user.

The area A of the plate 92 is then calculated to prevent the manual maneuvering of the valve 88 using the lug 100 between the closed position and the open position when the pressure difference on either side of the inner partition 70 is above a predetermined maximum value, this maximum value for example being below 10,500 Pa, in particular 10,335 Pa (1.5 psi) and preferably equal to 8,268 Pa (1.2 psi).

This area A is calculated by equal $$A = \frac{m \cdot g}{p},$$

where A is the area of the plate 92, m. is the maximum applied mass, g is equal to 9.81 m·s$^{-2}$ and p is the maximum pressure value. The rod 94 is inserted into the skirt 86. It protrudes past the skirt 86 to engage mechanically with the locking assembly 76, as will be seen below.

The ring 96 is mounted fixed on the rod 94, near its free end. It is able to guide the rod 94 in translation in the skirt 86.

The elastic biasing member 98 is inserted between the ring 96 and the seat 82. Here, it is formed by a helical spring. By default, it stresses the valve 88 toward its closed position.

The lock 90 is able to be maneuvered manually between a configuration blocking the valve 88 in its closed position and a configuration releasing the valve 88.

It is for example formed by a rotating butterfly 106, one of the branches of which presses on the plate 92 in the blocking configuration. The lock 90 further includes staples 108 for blocking the butterfly 106 in each of the blocking and released configurations.

In reference to FIG. 6, the handling assembly 75 includes a peripheral handling loop 110, fastened on an inner surface of the inner partition 70.

The releasable locking assembly 76 includes, across from the inner surface of the inner partition 70, at least one closing pin 112 intended to lock the inner partition 70 on the guiding sleeve 34, a rotating lever 114 for actuating each closing pin 112, and a transmission mechanism 116 connecting the lever 114 to each closing pin 112.

The assembly 76 also includes, on the side of an outer surface of the inner partition 70, a blocking arm 118 connected to the lever 114, able to cooperate with the valve 88 to prevent the unlocking of the locking assembly 76 when the valve 88 is in its closed position.

Figure 7:
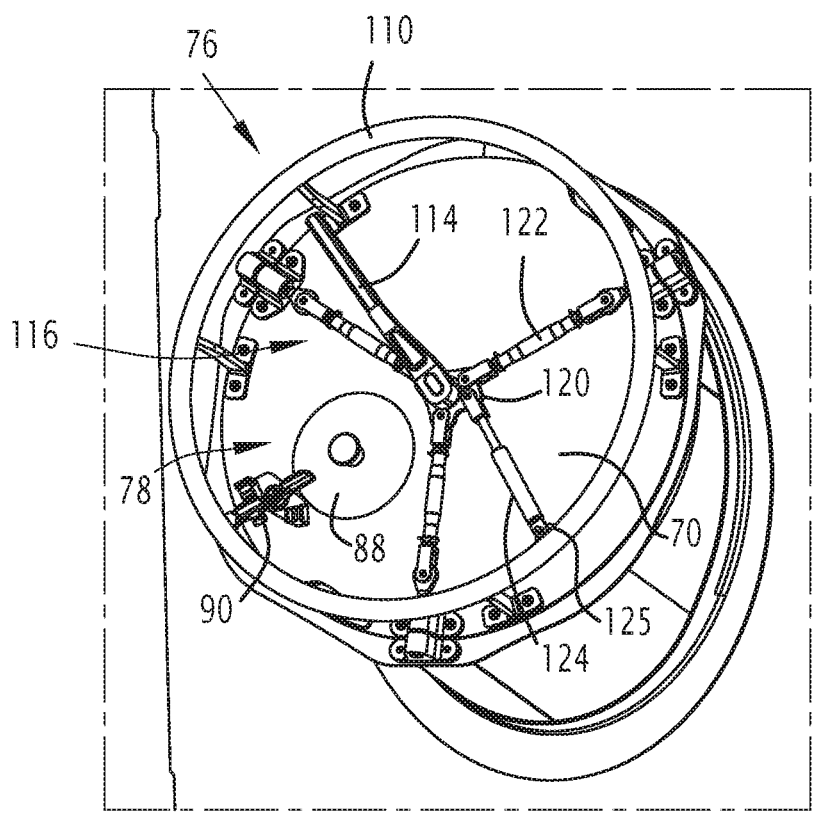
FIG. 7 is a front view of the dropping system, when the hatch is inserted in the panel.

In the example shown in FIG. 7, the locking assembly 76 includes a plurality of closing pins 112 distributed on the periphery of the inner partition 70. Each closing pin 112 is radially movable under the action of the lever 114 to be inserted in the locking elements 54 present on the guiding sleeve 34.

The lever 114 is mounted rotating around an axis advantageously coaxial with the axis of the through opening 32 when the hatch 36 is inserted in the through opening 32. The lever 114 is able to be maneuvered manually by a user to cause the locking assembly 76 to go from a locking configuration to a released configuration of the inner partition 70.

The transmission mechanism 116 includes, on the side of the inner surface of the inner partition 70, an eccentric 120, rotatable jointly with the lever 114, and for each closing pin 112, a connecting rod 122 connecting the eccentric 120 to the pin 112.

The mechanism 116 further includes a bistable member 124, connecting the eccentric 120 to a fixed point 125 on the partition, to bias the lever 114 in order to keep the locking assembly 76 in the locking configuration or in the released configuration, when idle.

Figure 9:
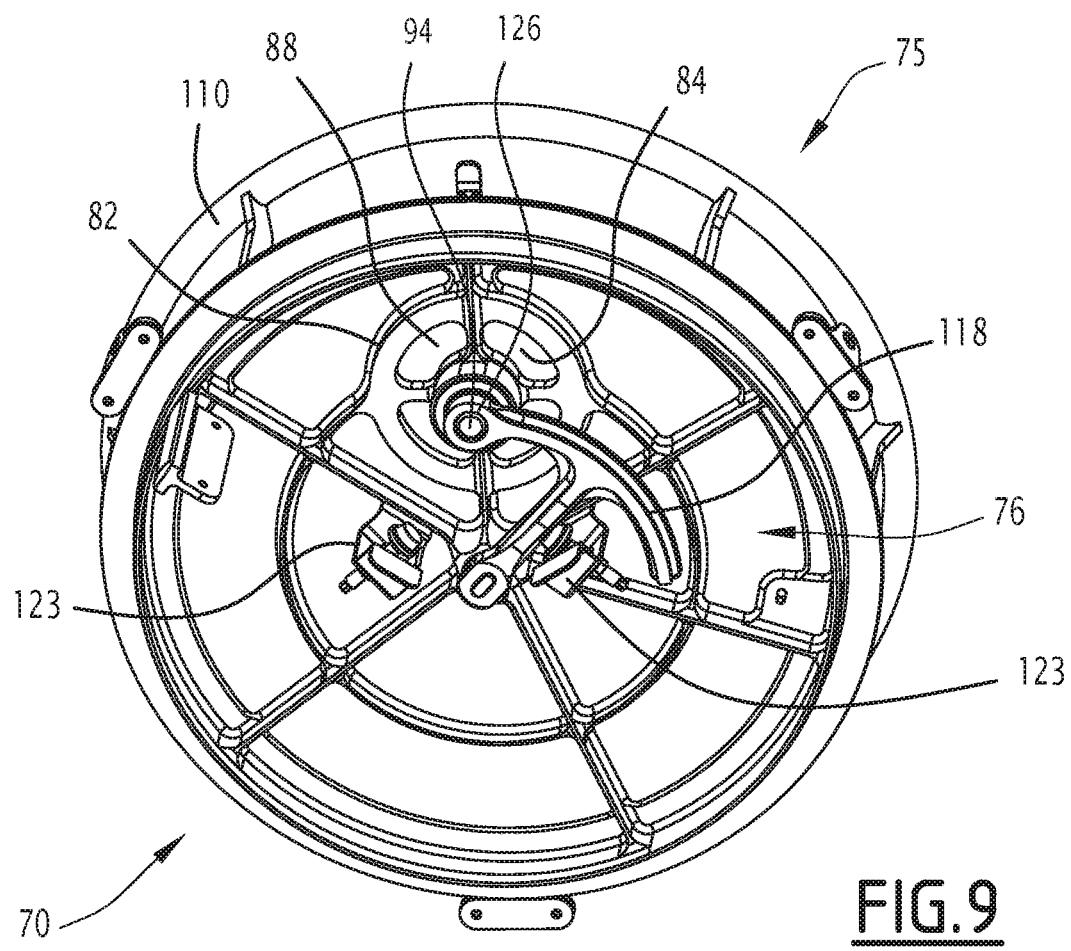
FIG. 9 is a bottom view of the inner partition of the hatch of FIG. 6, before unlocking the valve.
Figure 13:
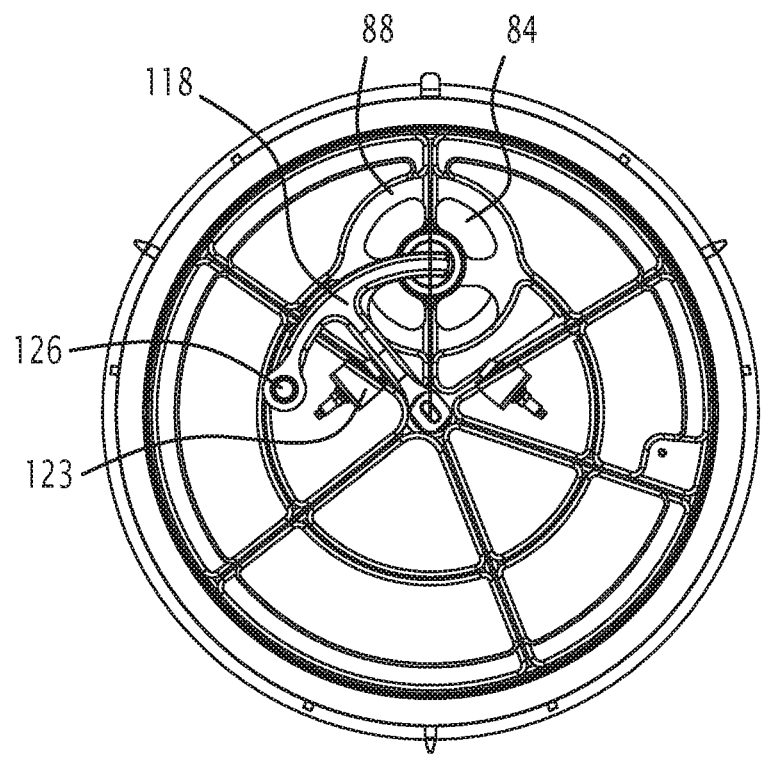
FIG. 13 is a view similar to FIG. 9, after releasing the locking assembly.
Figure 14:
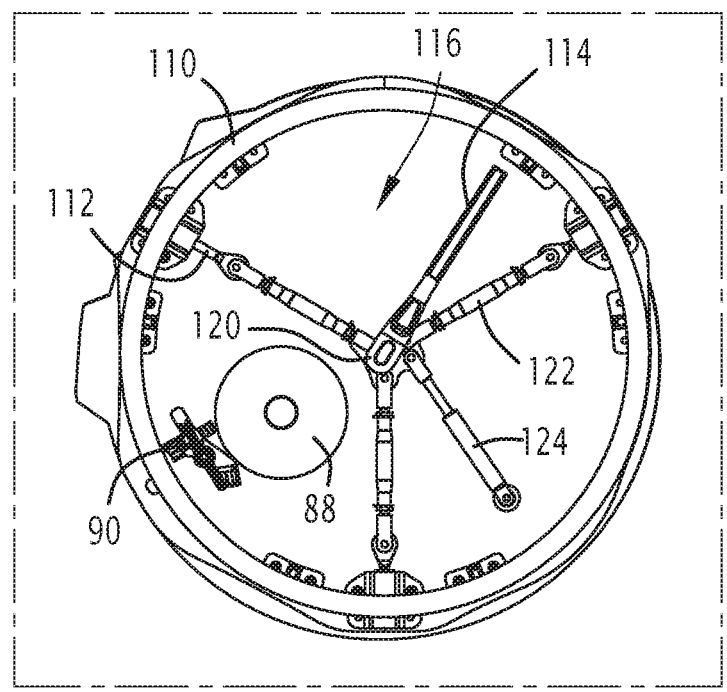
FIG. 14 is a view similar to FIG. 7, after releasing the locking assembly.

In reference to FIGS. 9 and 13, the blocking arm 118 is connected to the lever 114 through the inner partition 70. It is jointly rotatable with the lever 114, between two adjustable stops 123 that limit its angular travel around the rotation axis of the lever 114. It has a curved shape centered on the rotation axis of the lever 114.

The blocking arm 118 defines a housing 126 for receiving the rod 94 of the valve 88. Thus, when the valve 88 is in its closed position, the end of the rod 94 is received in the housing 126 to block the rotation of the blocking arm 118, and subsequently, the lever 114, as shown in FIG. 11.

Conversely, when the valve 88 is in its open position, shown in FIG. 12, the end of the rod 94 has been freed from the housing 126, and the blocking arm 118 and lever 114 are freely rotating around the rotation axis of the lever 114.

In reference to FIG. 5, the dropping guide 38 includes a tubular enclosure 130, open at its ends, a gripping flange 132, situated on the inner edge of the tubular enclosure 130, and guide protrusions 134 able to cooperate with the guide elements 56 of the guide sleeve 34.

The tubular enclosure 130 has a cross-section with a contour substantially complementary to the inner contour of the through opening 32 in the guide sleeve 34. It has a length greater than that of the guide sleeve 34.

The guide 38 includes an end segment 136 able to protrude outside the guide sleeve 34. As shown in FIG. 5, the end segment 136 advantageously defines an outer indentation 138 making it possible to guide the dropping of the package 13 in a preferred direction.

The gripping flange 132 is provided with handles 140 and radial stops 142 for fastening on the locking elements 54 of the guide sleeve 34.

The dropping guide 38 is able to be inserted manually in the guide sleeve 34, in place of the removable hatch 36. Once inserted into the guide sleeve 34, the outer part 136 protrudes past the outer skin 18 of the aircraft 10 to move the package 13 away from the aircraft 10 when it is dropped. The guide 38 then occupies a deployed position.

The length of the outer part 136 removed outside the through opening 32 is greater than 20% of the total length of the guide, considered along its axis.

The indentation 138 prevents the package 13 from jamming at an angle. It also provides reproducibility of the ejection trajectory of the package 13 outside the guide 38.

Figure 8:
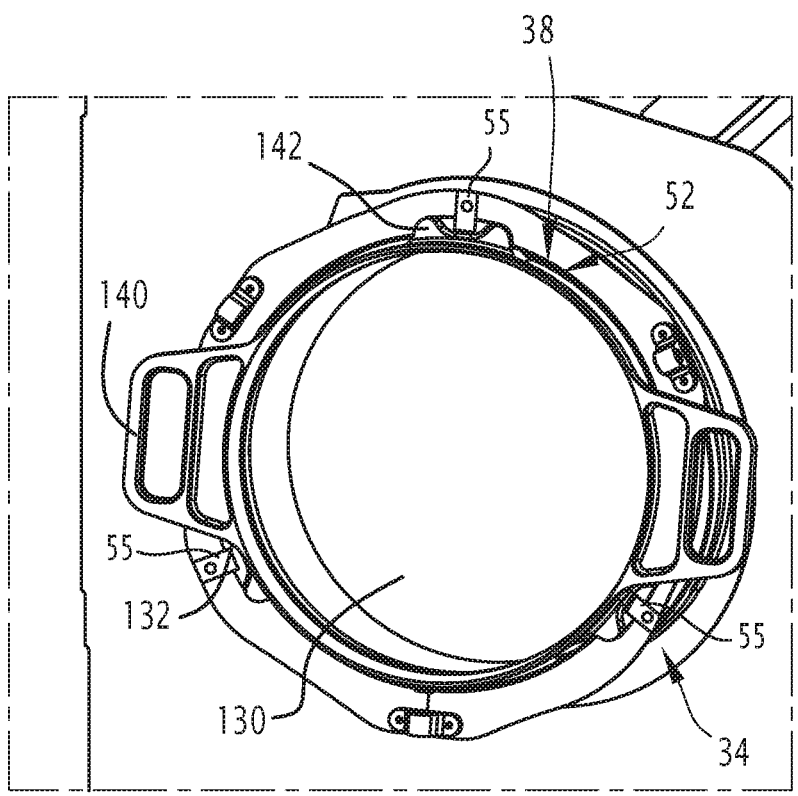
FIG. 8 is a view similar to FIG. 7, when the guide is inserted in the panel.

In reference to FIG. 8, the locking elements 55 of the guide 38 are formed by tongues mounted rotating by a quarter revolution on the collar 52 between a position freed from the gripping flange 132 and a position engaged on the gripping flange 132.

The operation of the dropping system 12 will now be described.

Initially, the dropping system 12 has been mounted on the structure 14 of the aircraft 10, at an access passage 22 provided in this structure 14 to access the cabin or a baggage compartment. This mounting for example replaces a door placed in the access passage 22.

The interfaces 24 present in the access passage 22 are used to fasten the intermediate wall 44 of the panel 30 on the inner framework 16. In this configuration, as shown in FIG. 1, the outer wall 42 of the dropping system 12 is flush with the outer skin 18 of the aircraft 10.

Furthermore, the hatch 36 has been inserted beforehand in the through opening 32, through the guide sleeve 34. The outer partition 72 closes the through opening 32 outwardly. It is flush with the outer wall 42 of the panel 30, minimizing the aerodynamic disruptions on the aircraft 10.

The inner partition 70 is pressed against the guide sleeve 34 and closes it off sealably.

The locking assembly 76 is kept in its locking configuration. To that end, the closing pins 112 cooperate with the locking elements 54 on the guiding sleeve 34. The bistable member 124 keeps the lever 114 stably in this configuration.

The valve 88 is in its closed position. The plate 92 is pressed sealably on the seat 82 defined in the inner partition 70. This prevents air from passing from the inner volume 20 toward the outside through the through apertures 84. The elastic biasing member 98 keeps the plate 92 pressed against the seat 82.

The rod 94 of the valve 88 is received in a complementary manner in the housing 126, blocking the rotation of the blocking arm 118, and subsequently, the lever 114.

The lock 90 is arranged bearing on the plate 92, preventing the valve 88 from moving toward the open position.

The inner volume 20 can therefore be pressurized, without leaks toward the outside through the through opening 32.

In light of the dimensions of the plate 92, and the presence of lock 90, it is impossible for a user to pull the valve 88 inadvertently. The lock 90 also makes it possible to keep the valve 88 closed in case of outside pressure exceeding the inside pressure, in particular during outside air discharge in the case of a rapid descent of the aircraft 10.

Furthermore, although the lock 90 is pivoted to release the valve 88, the latter remains closed if the difference between the internal pressure and the external pressure is too great, according to the predetermined threshold defined by the area of the plate 92 of the valve 88.

The valve 88 being immobilized in position, it is also impossible for a user to maneuver the lever 114, which guarantees that the hatch 36 cannot be removed inadvertently.

When the aircraft 10 reaches the dropping zone, and it is low enough for the difference between the internal pressure and the external pressure to be below the predetermined threshold, the user manually maneuvers the lock 90 to free it from the valve 88.

To that end, he grasps the handling lug 100 of the valve 88 accessible from the inside volume 20 and pulls inward on the valve 88, against the biasing force created by the elastic biasing member 98.

He compresses the biasing member 98 and move the rod 94 inward. The plate 92 then moves away from the seat 82, as shown in FIG. 12, freeing an air passage to allow pressure balancing between the inner volume 20 of the aircraft 10 and the outside of the aircraft 10, through the apertures 84 and the through opening 32.

Furthermore, the rod 94 leaves the housing 126 and frees the blocking arm 118. The user then manually maneuvers the lever 114 to take the locking assembly 76 from its locking configuration to its unlocked configuration.

The rotation of the lever 114 around its axis jointly rotates the eccentric 120 and the blocking arm 118. Under the effect of the movement of the connecting rods 122, the closing pins 112 are freed from the locking elements 54 by moving toward the rotation axis of the lever 114.

When the locking assembly 76 is in its unlocked configuration, the lever 114 is kept in position by the bistable member 124. The inner partition 70 is then free to move relative to the guide sleeve 34.

The user then grasps the hatch 36 via the handling loop 110 and completely removes the hatch 36 from the guide sleeve 34 to free the through opening 32.

The hatch 36 is guided in translation along the through opening 32 by the cooperation between the guides 80 and the guide elements 56 present in the sleeve 34.

Next, the user grasps the dropping guide 38 and inserts it into the guide sleeve 34 by its outer part 136 through the through opening 32.

The insertion of the dropping guide 38 into the sleeve 34 is guided by the cooperation between the guide protrusions 134 present on the tubular enclosure 130 and the guide elements 56.

The dropping guide 38 is inserted until the inner flange 132 abuts against the collar 52.

Figure 2:
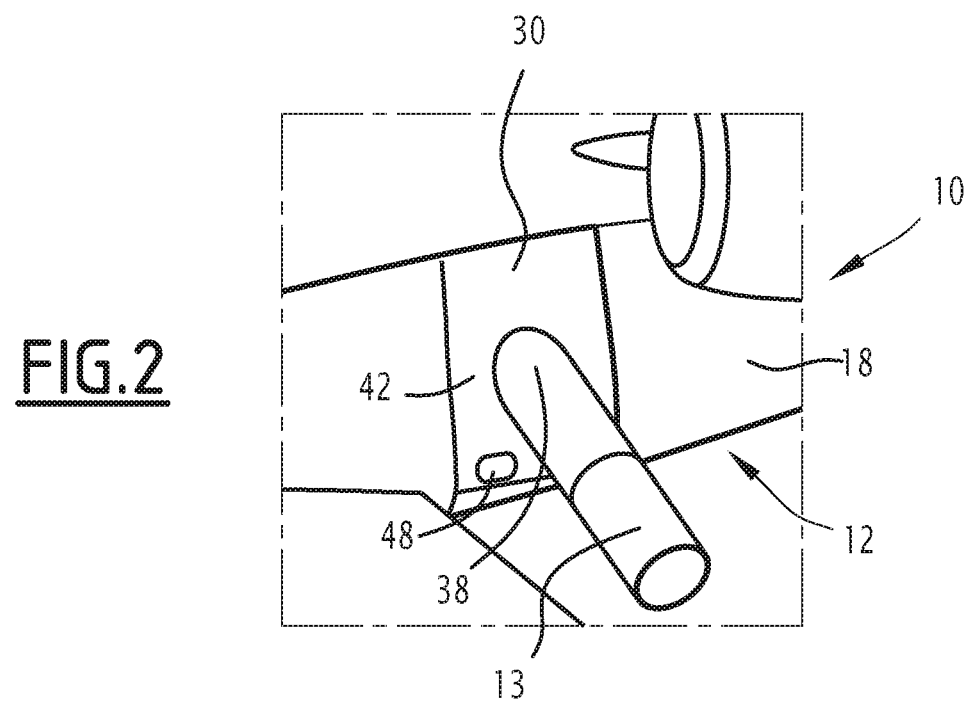
FIG. 2 is a view similar to FIG. 1, in an open configuration.

In this position, as illustrated in FIG. 2, the outer part 136 protrudes outside the through opening 32 from the outer wall 42. The indentation 138 is then oriented downward and backward.

The locking elements 55 are moved in their engaged position on the gripping flange 132.

The package 13 is then introduced into the dropping guide 38 in the inner volume 20. The package 13 is then pushed toward the outside to be dropped in the desired position.

The presence of the dropping guide 38 makes it possible to control the direction of the dropping and to travel the same trajectory again each time a package 13 is dropped. Furthermore, a sufficient safety distance between the dropped package 13 and the fuselage of the aircraft 10 is guaranteed by the presence of the dropping guide 38.

Once the dropping is done, the dropping guide 38 is freed from the guide sleeve 34 by performing the operations previously described, in reverse.

Then, the hatch 36 is reinserted in the guide sleeve 34, in place of the dropping guide 38. The lever 114 is maneuvered to deploy the closing pins 112 in the locking elements 54 on the guiding sleeve 34 until reaching the locking configuration.

The rod 94 then penetrates the housing 126 to block the rotation of the blocking arm 118 and the lever 114, as previously described. The lock 90 is placed on the valve 88.

The dropping system 12 has the advantage of not modifying the primary structure 14 of the aircraft 10, since it is inserted in the access passages 22 provided in this structure 14 to access the cabin and/or baggage compartments of the aircraft. The interfaces 24 used to close off the access passages 22 with the assistance of doors are usable to mount the panel 30 of the dropping system, without substantial modifications.

Replacing a basic door of the aircraft 10 with the dropping system 12 is therefore easy and reversible.

Furthermore, the maneuvering of the different components of the dropping system 12 is easy and can be done by hand by a user. It does not require any auxiliary power, or particular utility. Upkeep and risks of breakdown are therefore minimized.

Owing to the presence of a connection between the valve 88 and the lever 114 for maneuvering the unlocking of the hatch 36, safety during the flight is ensured by making it possible to balance the internal and external pressures only at a low enough altitude to be safe. It is therefore impossible to unlock the lever 114 as long as the pressures are not balanced between the internal volume 20 of the aircraft 10 and the outside.

The unlocking of the hatch 36 is manual, and does not require any auxiliary power. As before, upkeep and risks of breakdown are therefore minimized.

In one alternative, the dropping system 12 is implemented without providing a valve 88, as previously described.

In another alternative, the removable hatch 36 is used to close off a through opening 32 of the aircraft 10 that is not necessarily intended to drop a package 13.

As shown in the figures, the hatch 36 is configured to be maneuvered from the configuration closing the through opening 32 to the configuration allowing the package 13 to pass through the through opening 32, from the inner volume 20 of the aircraft 10, by moving the hatch 36 in the direction from the outside of the inner volume 20 of the aircraft 10 towards the inside of the inner volume 20 of the aircraft 10.

The guide 38 is configured to be inserted in the guide sleeve 34, in place of the hatch 36, from the inner volume 20 of the aircraft 10, by moving the guide 38 in the direction from the inside of the inner volume 20 of the aircraft 10 towards the outside of the inner volume 20 of the aircraft 10.

Hence, maneuvers of the hatch 36 and of the guide 38 can be carried out by an operator located in the inner volume 20, in flight.

What is claimed is:

1. A hatch for closing an opening provided through an aircraft structure, comprising:
    an inner sealing partition, configured to be mounted sealably on an aircraft structure;
    a releasable lock for locking the inner partition on the structure, the releasable lock being configured to be maneuvered between a locking configuration and a released configuration of the inner partition;
    a valve for balancing pressure between an inner surface of the inner partition configured to be placed in an inner volume of the aircraft and an outer surface of the inner partition, configured to communicate with the outside of the aircraft, the valve being configured to be movable by a user between a closed sealing position and an open pressure balancing position, the releasable lock being configured to be immobilized in the locking configuration when the valve is its closed sealing position.

2. The hatch according to claim 1, wherein the valve is mechanically connected to the releasable lock in the closed sealing position, the valve being released from the releasable lock in the open pressure balancing position.

3. The hatch according to claim 1, wherein the valve includes a moving rod protruding from the inner surface of the inner partition, the releasable lock comprising a blocking arm arranged on the side of the outer surface of the inner partition, the blocking arm defining a housing for receiving the moving rod in the closed sealing position.

4. The hatch according to claim 1, wherein the releasable lock comprises an actuating lever, arranged on the side of the inner surface of the inner partition, the lever being movable relative to the inner partition to transition the releasable lock to the released configuration of the inner partition.

5. The hatch according to claim 4, wherein the valve includes a moving rod protruding from the inner surface of the inner partition, the releasable lock comprising a blocking arm arranged on the side of the outer surface of the inner partition, the blocking arm defining a housing for receiving the moving rod in the closed sealing position, the actuating lever being connected to the blocking arm through the inner partition.

6. The hatch according to claim 5, wherein the releasable lock comprises at least one closing pin configured to immobilize the inner partition on the structure, the at least one closing pin being connected to the lever by a transmission mechanism.

7. The hatch according to claim 1, further comprising a biaser for elastically biasing the valve toward its closed position.

8. The hatch according to claim 1, wherein the inner partition defines at least one pressure balancing through aperture, the valve being configured to sealably cover the through aperture in the closed position, the valve being configured to allow gas to pass between the inner surface and the outer surface of the inner partition through the through aperture in the open position.

9. The hatch according to claim 1, further comprising a valve lock immobilizing the valve in the closed position, configured to be maneuvered on the inner surface of the inner partition.

10. The hatch according to claim 1, wherein the valve includes a manual grasping lug protruding inward away from the inner surface of the inner partition.

11. The hatch according to claim 10, wherein the valve is configured to be moved by a manual pulling force exerted on the lug up to a maximum pressure difference value between the inner surface and the outer surface of the intermediate partition, the maximum value being less than 10,500 Pa.

12. The hatch according to claim 11, wherein the lug is configured to allow the exertion of a maximum manual pulling force comprised between 10 kgf and 15 kgf.

13. The hatch according to claim 1, further comprising an outer partition configured to close off the opening in the fuselage, and an intermediate framework connecting the inner partition to the outer partition.

14. A system for dropping a parcel from an aircraft, comprising:
    a panel configured to form part of a skin of the aircraft, the panel defining a through opening emerging outside the aircraft;
    the hatch according to claim 1; and
    a guide sleeve guiding the hatch through the panel, the guide sleeve emerging in the through opening, the hatch being configured to be maneuvered in the guide sleeve between a configuration closing the opening and a configuration allowing the parcel to pass through the through opening.

15. A method for freeing an opening arranged through an aircraft structure, comprising:
    closing off the opening by the hatch according to claim 1;
    immobilizing the releasable lock in the locking configuration when the valve is in the closed sealing position;
    moving the valve, by a user, between a closed sealing position and an open pressure balancing position; then
    maneuvering the releasable lock between the locking configuration and the released configuration.

16. The method according to claim 15, wherein the valve is mechanically connected to the releasable lock in the closed sealing position, the method comprising releasing the valve away from the releasable lock when the valve goes to the open pressure balancing position.

17. A hatch for closing an opening provided through an aircraft structure, comprising:
- an inner sealing partition, configured to be mounted sealably on an aircraft structure;
- a releasable lock for locking the inner partition on the structure, the releasable lock being configured to be maneuvered between a locking configuration and a released configuration of the inner partition;
- a valve for balancing pressure between an inner surface of the inner partition configured to be placed in an inner volume of the aircraft and an outer surface of the inner partition, configured to communicate with the outside of the aircraft, the valve being configured to be movable by a user between a closed sealing position and an open pressure balancing position, the releasable lock being configured to be immobilized in the locking configuration when the valve is its closed sealing position,
- the unlocking of the releasable lock being prevented when the valve is in the closed sealing position.

* * * * *